(12) United States Patent
Tanaka et al.

(10) Patent No.: US 6,817,382 B2
(45) Date of Patent: Nov. 16, 2004

(54) PILE MEMBER

(75) Inventors: Shigeki Tanaka, Yokkaichi (JP); Mikio Morinaga, Yokkaichi (JP); Hiroshi Kashima, Yokkaichi (JP)

(73) Assignee: Bestex Kyoei Co., Ltd., Mie (JP)

( * ) Notice: Subject to any disclaimer, the term of this patent is extended or adjusted under 35 U.S.C. 154(b) by 0 days.

(21) Appl. No.: 10/079,611

(22) Filed: Feb. 19, 2002

(65) Prior Publication Data

US 2003/0084948 A1 May 8, 2003

(30) Foreign Application Priority Data

Nov. 8, 2001 (JP) .......................... 2001-342634
Dec. 10, 2001 (JP) .......................... 2001-375500

(51) Int. Cl.$^7$ .............................. F16L 9/22; G12B 9/08
(52) U.S. Cl. ...................... 138/109; 138/155; 138/177; 248/27.1
(58) Field of Search ................................ 138/109, 155, 138/177, 145; 248/27.1; 285/288.3, 399, 332.4, 237; 72/370.06, 370.07, 370.24

(56) References Cited

U.S. PATENT DOCUMENTS

| | | | | |
|---|---|---|---|---|
| 904,189 A | * | 11/1908 | Everson | |
| 2,763,057 A | * | 9/1956 | Clair, Jr. | 285/329 |
| 3,156,042 A | * | 11/1964 | Reed | |
| 3,830,262 A | * | 8/1974 | Lago | 138/143 |
| 4,069,573 A | * | 1/1978 | Rogers, Jr. et al. | 138/98 |
| 4,161,273 A | * | 7/1979 | Jeffers | 285/286 |
| 4,525,001 A | * | 6/1985 | Lumsden et al. | 285/328 |
| H82 H | * | 7/1986 | Dittrich et al. | 138/155 |
| 4,645,247 A | * | 2/1987 | Ward | 285/382.1 |
| 4,793,404 A | * | 12/1988 | Hata | 138/140 |
| 4,819,969 A | * | 4/1989 | Williams | 285/148.23 |
| 4,846,264 A | * | 7/1989 | Hata | 138/145 |
| 5,064,225 A | * | 11/1991 | Williams et al. | 285/148.26 |
| 5,109,888 A | * | 5/1992 | Usui | 138/109 |
| 5,129,253 A | * | 7/1992 | Austin et al. | 72/370.07 |
| 5,265,793 A | * | 11/1993 | Usui et al. | 138/143 |
| 5,482,090 A | * | 1/1996 | Yamanashi | 138/171 |
| 5,511,831 A | * | 4/1996 | Barton | 285/382 |
| 5,853,203 A | * | 12/1998 | Crandall | 138/155 |

FOREIGN PATENT DOCUMENTS

JP          8058432          3/1996

* cited by examiner

Primary Examiner—James Hook
(74) Attorney, Agent, or Firm—Merchant & Gould P.C.

(57) ABSTRACT

A metal pipe 11 of a smaller diameter engages a metal pipe 13 of a larger diameter to provide a double-pipe structure in a predetermined area in the longitudinal direction, wherein the diameter of the two pipes 11 and 13 of the double-pipe structure section is integrally expanded using a pipe expansion technique. By making a predetermined section of the pipe member a double-pipe structure, it is possible to provide the strength and rigidity necessary for each section. It is also possible to join the two pipes by expanding the diameter of each pipe at the double-pipe structure section. By forming a section where high strength is not required by a pipe of a smaller diameter, it is possible to lighten the pipe member. Materials for the pipes 11 and 13 are carbon steels for machine structural use. If aluminum is used for the metal pipe 11 of a smaller diameter, it is possible to further lighten the pipe member.

3 Claims, 9 Drawing Sheets

FIG. 2
(a)
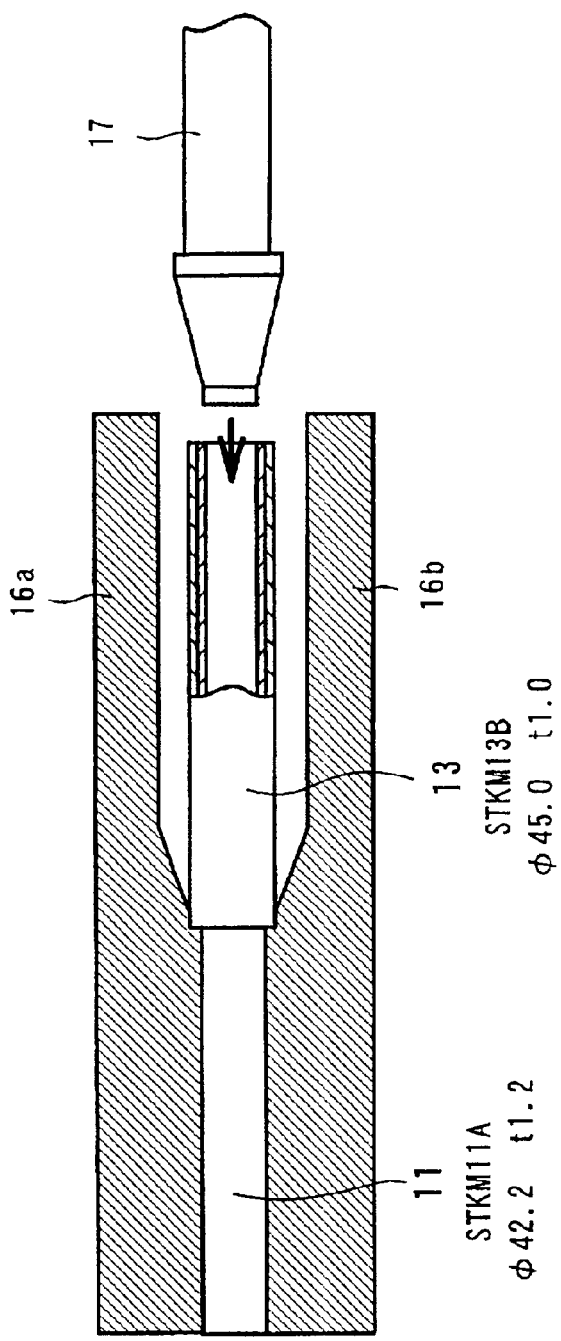
(b)
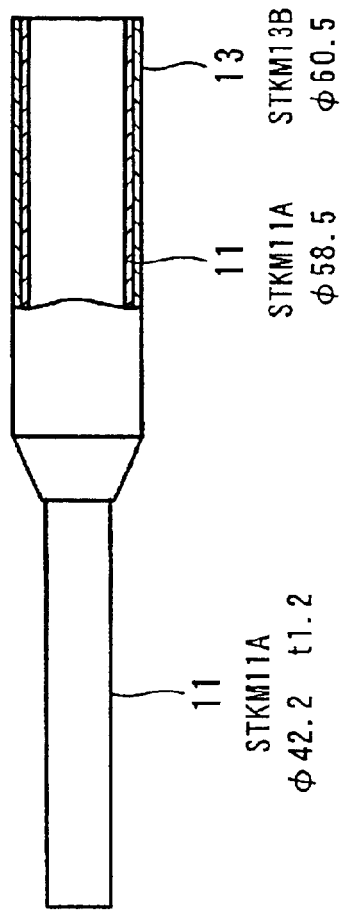

FIG. 6
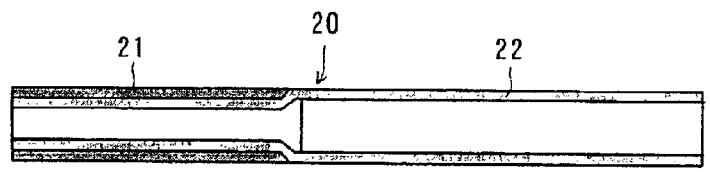
FIG. 7
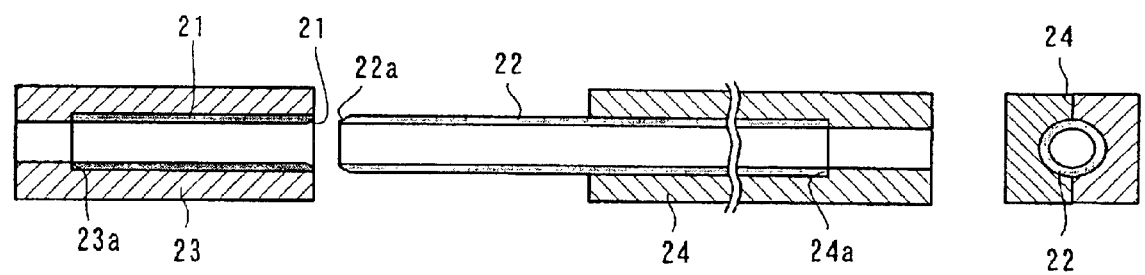
(a)
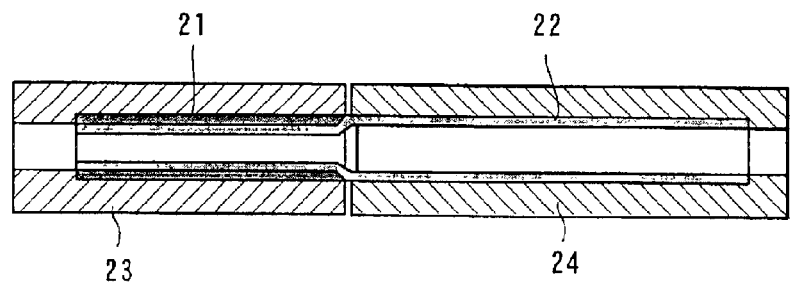
(b)

Integral type

SKTM13B  φ60.5  t2.0

Split type

| Pipe A | Pipe B |
| SKTM11A | SKTM13B |
| φ42.7  t1.2 | φ60.5  t2.0 |

Pipe B is first processed by drawing to have the same dimension as pipe A.
Then, both pipes A, B are joined by welding.

PILE MEMBER

BACKGROUND OF THE INVENTION

1. Field of the Invention

The present invention relates to a pipe member for forming a main beam such as a steering hanger beam for use in, for example, an automobile, and, in particular, to a pipe member of which the part in the longitudinal direction forms a large diameter section of a multiple pipe structure to improve strength and to lighten.

2. Description of the Prior Art

FIG. 10 is an exploded perspective view showing one example of a steering hanger beam for a conventional right-hand drive car. The steering hanger beam is a member provided in the lateral direction of an automobile to mount an instrument panel on a body. The steering hanger beam is, as shown in FIG. 10, constructed by mounting various kinds of brackets or the like on a pipe member forming a main beam.

The pipe member forming the main beam is, as shown in FIG. 11, constructed from a single pipe of the same material, outer diameter, and thickness (e.g. carbon steel for machine structural use, outer diameter of 60.5 mm, and thickness of 2 mm). This pipe is made of a metal such as carbon steel (STKM) for machine structural use or aluminum.

There is also a case where a pipe member is used for which the diameter is expanded only on the driver's seat side, where strength and rigidity are required, to have a larger cross-section. For example, Japanese Unexamined Patent Publication No. HEI 8-58432 discloses reinforcement for an instrument panel which is provided with a thick and large diameter section for supporting steering on the driver's seat side, a thin and small diameter section for supporting interior parts on the passenger seat side, and a tapered section for connecting the large diameter section to the small diameter section. Japanese Unexamined Patent Publication also discloses a hollow stepped pipe for producing the reinforcement and a production method for the reinforcement.

Further, as a pipe member for forming the main beam, as shown in FIG. 12, a pipe member of a split type formed by joining two kinds of pipes with different material, outer diameter, and thickness by welding is used. For example, a pipe A made of carbon steel for machine structural use (JIS G 3445 STKM11A) of an outer diameter of 42.7 mm and a thickness of 1.2 mm is used on the passenger seat side. A pipe B made of carbon steel for machine structural use (JIS G 3445 STKM13B) of an outer diameter of 60.5 mm and a thickness of 2 mm is used on the driver's seat side. An end of the larger diameter pipe B is processed by drawing to allow the outer diameter to agree with the pipe A of a smaller diameter and both pipes A and B are then joined by arc welding or the like.

In the pipe member of an integral type shown in FIG. 11, the material, outer diameter and thickness are determined according to a section where strength and rigidity are most required. Accordingly, there is overspecification for such a section where strength and rigidity are not required, resulting in overweight. The manufacture of the pipe member of the split type shown in FIG. 12 is highly costly because of the joint.

In recent years, performance required for the steering hanger beam has become higher because of safety measures when automobiles collide. As a result, many parts are incorporated to satisfy desired values. Thus, the total weight of the steering hanger beam has increased. It is therefore desirable that strength and rigidity necessary for each section such as the passenger seat side and the driver's seat side be secured and the pipe member forming a main beam be lightened.

SUMMARY OF THE INVENTION

It is therefore an object of the present invention to solve the above-mentioned problems and to provide an improved pipe member which can secure strength and rigidity required for each section and lighten the pipe member by partially making the pipe member a multiple pipe structure (including a double pipe structure) and integrally expanding the diameter of this multiple pipe structure section using a pipe expansion technique.

To solve the problems above, in a pipe member according to the present invention, engaged with or press-fitted to the outside of a metal pipe is a metal pipe of a larger diameter than the former. In this manner, a multiple pipe structure is formed in a predetermined area in the longitudinal direction and the diameter of this multiple pipe structure section is integrally expanded.

By making a predetermined section of the pipe member a multiple pipe structure, it is possible to allow each section to have the necessary strength and rigidity. By expanding the diameter of part or all of the multiple pipe structure section, it is possible to integrally join the pipes without welding. Since a section where high strength is not required is provided with a pipe of a smaller diameter, it is possible to lighten the pipe member.

Since an end of the multiple pipe structure section or a section close to that end is provided with a tapered section where the amount of diameter expansion gradually increases, it is possible to prevent the strength at this section from suddenly changing. Further, since the small diameter metal pipe can have a different material from the large diameter metal pipe, it is possible to obtain the strength necessary for each section. Still further, if one metal pipe forming the multiple pipes is made of aluminum, it is possible to further lighten the pipe member.

The pipe member according to the present invention is also applied to a main beam of a member for mounting an instrument panel. By engaging or press-fitting a metal pipe of a larger diameter to a metal pipe of a smaller diameter extending from the driver's seat side to the passenger seat side to provide a multiple pipe structure on the driver's seat side and by integrally expanding the diameter of the multiple pipe structure section, it is possible to allow each section of the driver's seat side and the passenger seat side to have necessary strength and rigidity and also to lighten the pipe member.

Referring to other pipe members according to the present invention, if a metal pipe with substantially the same diameter is press-fitted, while reducing the diameter, to the inside of the metal pipe of which the outer circumference is put under control, a multiple pipe structure section is integrally formed. By having such a construction, it is possible to easily produce pipes similar to a piece of pipe that has parts with different thicknesses.

Further, by expanding the diameter of the multiple pipe structure section from inside, it is possible to improve the strength of the multiple pipe structure section.

As described above, one metal pipe forming the multiple pipes can also be of another metal pipe such as aluminum or the like to lighten the pipe.

BRIEF DESCRIPTION OF THE DRAWINGS

The above and other objects, features and advantages of the present invention will become more apparent from the following description when taken in conjunction with the accompanying drawings.

FIGS. 2($a,b$) is a partially cross-sectional view showing the structure and a production method for a pipe member according to the present invention;

FIG. 6 is a cross-sectional view of a pipe member according to a still further embodiment;

FIG. 7 ($a$) is view showing a condition of a die and a punch for forming the pipe member shown in FIG. 6 before forming and FIG. 7 ($b$) is a view showing a condition after forming;

DETAILED DESCRIPTION OF THE PREFERRED EMBODIMENTS

Figure 1:
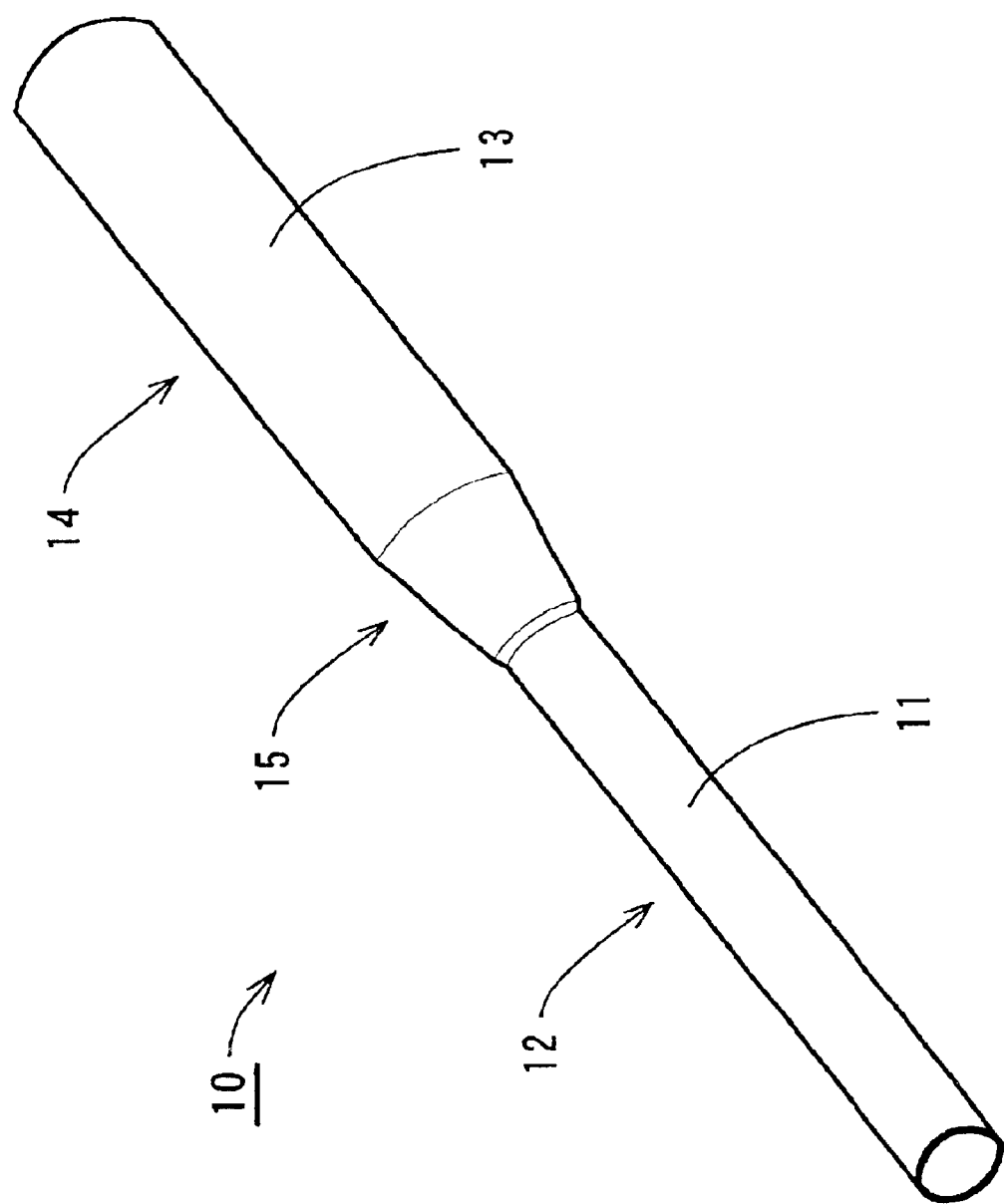
FIG. 1 is a perspective view showing the outer appearance of a pipe member according to the present invention.
Figure 3:
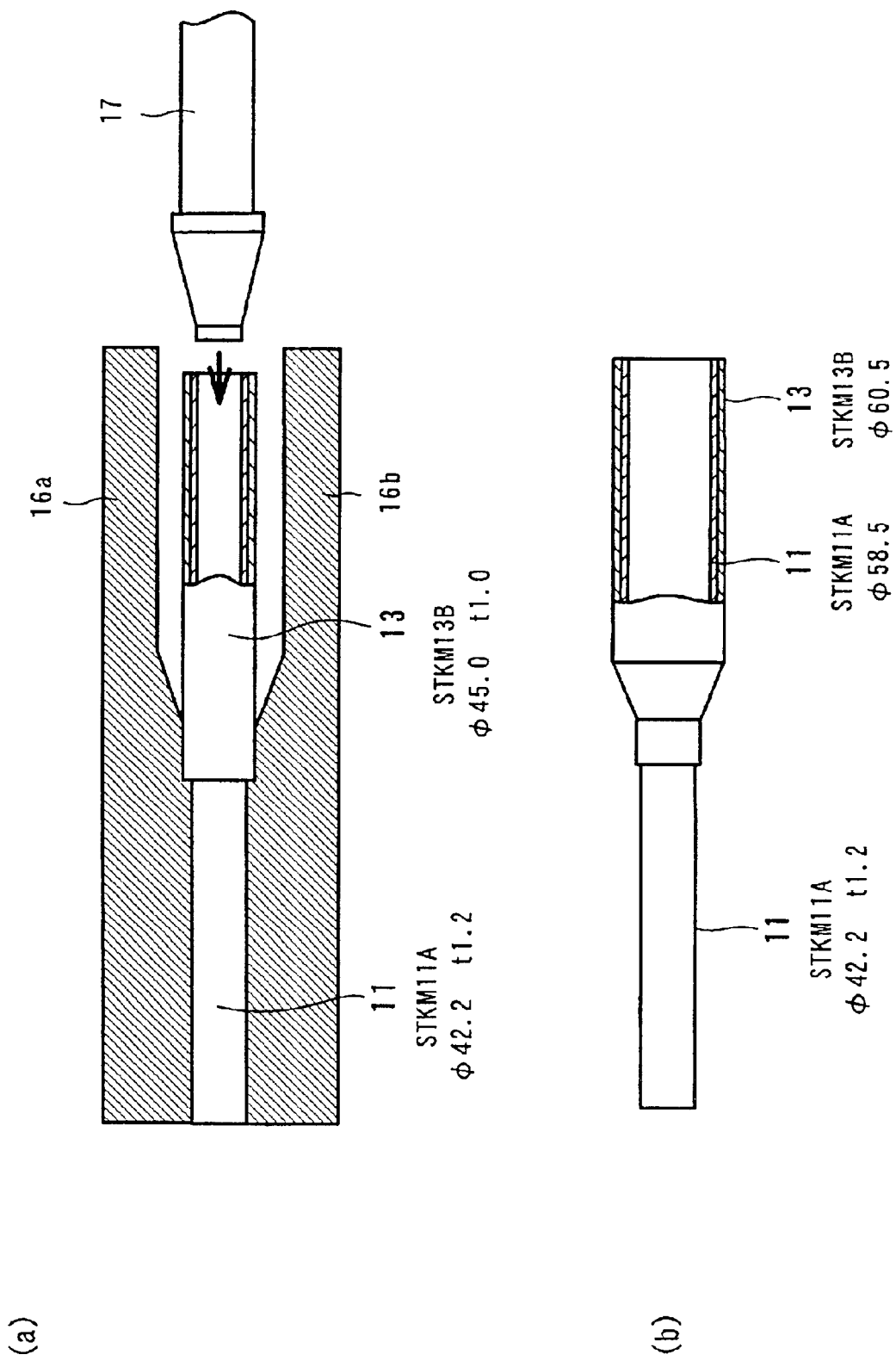
FIGS. 3($a,b$) is a view similar to FIG. 2 showing another embodiment.
Figure 4:
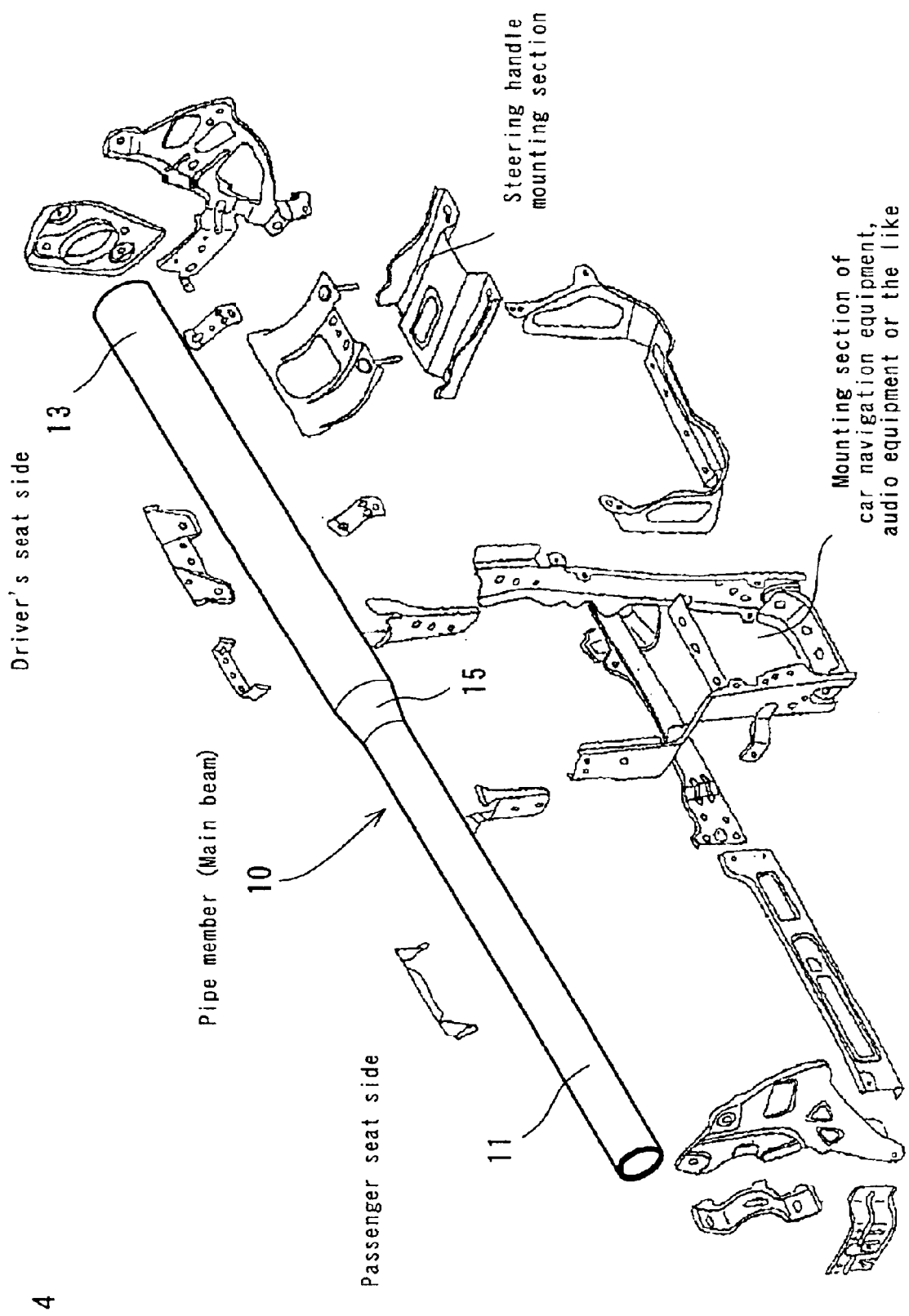
FIG. 4 is an exploded perspective view showing one specific example of a steering hanger beam for a right-hand drive automobile to which a pipe member according to the present invention is applied.
Figure 5:
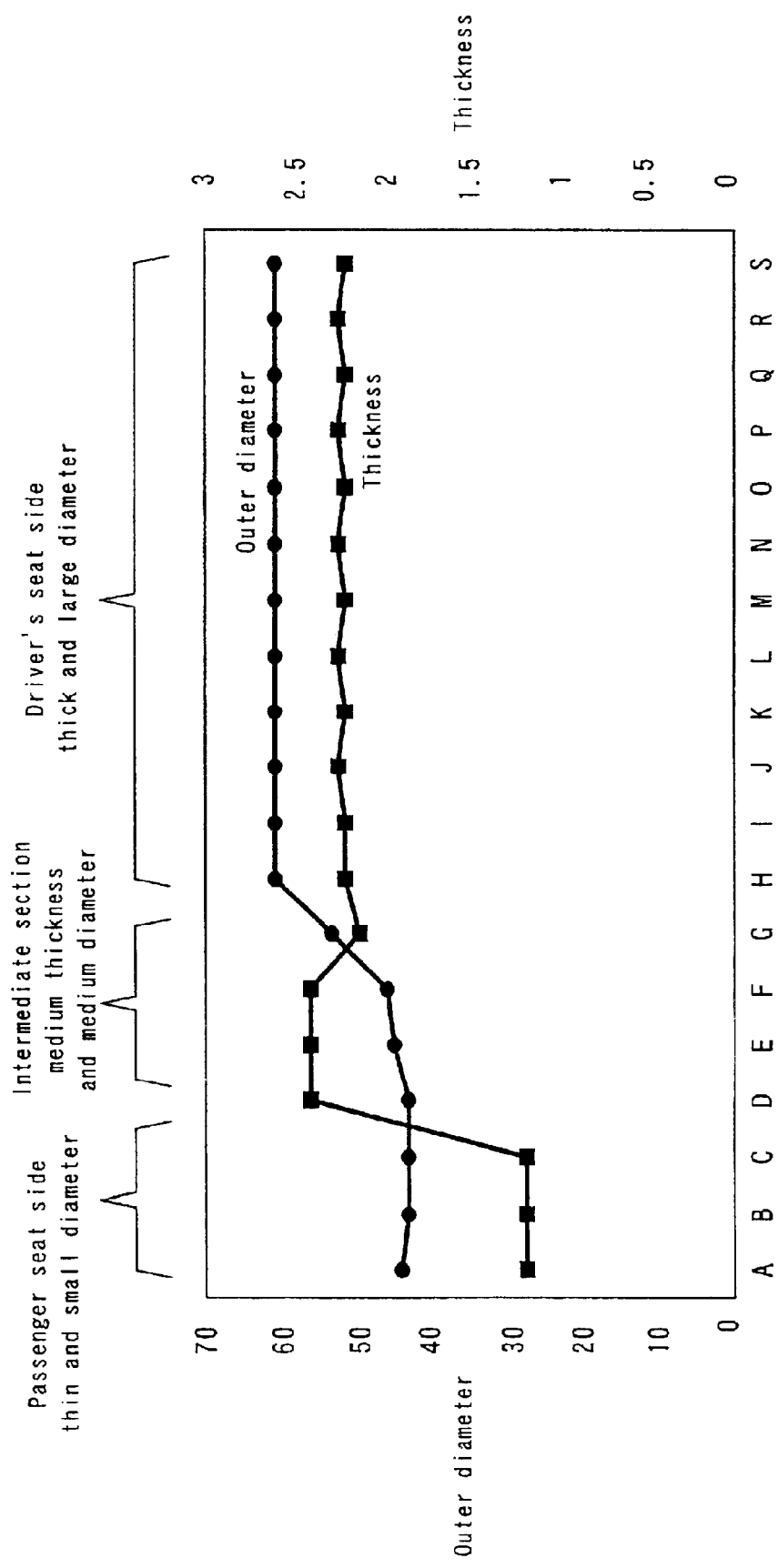
FIG. 5 is a graph showing one example of the outer diameter and thickness of each section of a pipe member for a steering hanger beam according to the present invention.

Preferred embodiments of the present invention will now be described with reference to the accompanying drawings. FIG. 1 is a perspective view showing the outer appearance of a pipe member according to the present invention and FIG. 2 is a partially cross-sectional view showing the structure and a production method for a pipe member according to the present invention. FIG. 3 is a partially cross-sectional view showing the structure and a production method for a pipe member according to another embodiment. FIG. 4 is an exploded perspective view showing one specific example of a steering hanger beam for a right-hand drive automobile to which the pipe member according to the present invention is applied. FIG. 5 is a graph showing one example of the outer diameter and thickness of each section of a pipe member for a steering hanger beam according to the present invention.

As shown in FIG. 1, a pipe member 10 according to the present invention comprises a small diameter section 12 which consists of only a small diameter steel pipe 11, a diameter-expanded section 14 of which the diameter has been expanded by a process of simultaneously expanding a double pipe structure section of the small diameter steel pipe 11 and a large diameter steel pipe 13, and a tapered section 15 of which the diameter dimension gradually changes.

As shown in FIG. 2 ($a$), the pipe member 10 is produced in such a manner that the small diameter steel pipe 11 is first inserted into the large diameter steel pipe 13 and both pipes 11 and 13 are then expanded together using a pipe expansion technique as shown in FIG. 2 ($b$).

A pair of clamping dies 16$a$ and 16$b$ and a pipe expansion punch 17 are used for pipe expansion. Namely, the small diameter steel pipe 11 and an outer peripheral end of the large diameter steel pipe 13 are inserted into cylindrically recessed half grooves of the clamping dies 16$a$ and 16$b$ for clamping. Then, the pipe expansion punch 17 with a taper-shaped end is pushed into the small diameter steel pipe 11 and the large diameter steel pipe 13 from one side thereof under pressure to form the diameter-expanded section at one end of the pipe.

Specifically, the large diameter steel pipe 13 is made of carbon steel for machine structural use (JIS G 3445 STKM13B) of an outer diameter of 45.0 mm and a thickness of 1.0 mm. The small diameter steel pipe 11 is made of carbon steel for machine structural use (JIS G 3445 STKM11A) of an outer diameter of 42.2 mm and a thickness of 1.2 mm, wherein the outermost diameter of a double pipe structural section is expanded up to 60.5 mm. Since both pipes 11 and 13 are expanded at the same time, they are joined (i.e. simultaneous pipe-expansion and clamping). Both pipes 11 and 13 can also be welded after the simultaneous pipe-expansion and clamping for joint reinforcement.

By selectively setting the material, outer diameter, thickness and diameter expansion measurement of the double pipe sections of each pipe 11, 13, it is possible to provide separate strength and rigidity for each section. In other words, it is possible to freely set the outer diameter and thickness of the pipe member to satisfy requirements for each section.

It is also possible for the small diameter pipe to be made of a different material than the large diameter pipe. For example, the small diameter pipe can be made of aluminum of an outer diameter of 40 mm and a thickness of 1.5 mm and the large diameter pipe can be made of a carbon steel for machine structural use (JIS G 3445 STKM11A) of an outer diameter of 42.7 mm and a thickness of 1.2 mm to provide a double pipe structure of the steel pipe and the aluminum pipe, wherein the diameter of the double pipe structural section is expanded. In this manner, if the aluminum pipe of a small diameter is used for a section where high strength and rigidity are not required, it is possible to lighten the pipe members.

FIGS. 3 ($a$) and ($b$) are views similar to FIG. 2 showing another embodiment. In this embodiment, an end of the large diameter pipe 13 is not suddenly provided with a tapered section 15. The tapered section 15 is provided at a predetermined distance form the end of the pipe 13.

FIG. 4 is an exploded perspective view showing one specific example of a steering hanger beam for a right-hand drive automobile to which a pipe member according to the present invention is applied. The steering hanger beam is provided on the driver seat side with a double pipe structure of which the diameter is expanded for securing strength and rigidity for a section on the driver's seat side. On the other hand, a small diameter pipe is provided on the passenger seat side where high strength is not required in order to lighten the steering hanger beam.

FIG. 5 is a graph showing one example of the outer diameter and thickness in each section of a pipe member for a steering hanger beam according to the present invention. In FIG. 5, the X-axis shows the position of a pipe in the longitudinal direction and the Y-axis shows the outer diameter and thickness of the pipe. By making the passenger seat side a smaller diameter and thickness, the driver's seat side a large diameter and thickness, and an intermediate section a medium diameter and thickness, it is possible to satisfy the conditions required in each section and to lighten the pipe members.

FIG. 6 is a cross-sectional view of a pipe member according to a still further embodiment. FIG. 7 (*a*) is a view showing the condition in which a die and a punch for forming the pipe member shown in FIG. 6 are situated before forming and FIG. 7 (*b*) is a view showing the condition of the die and punch after forming.

In this embodiment, the outer diameter of a pipe member 20 is constant throughout the length thereof. Namely, a single pipe structural section of steel pipes 21 and 22 has substantially the same diameter. In a double pipe structural section, one steel pipe 22 is integrally press fitted into the inside of another steel pipe 21 in a diameter-reduced condition.

To produce the pipe member 20, one steel pipe 21 is completely held within a clamping die 23 in such a manner that the outer circumstance is put under control. The clamping die 23 is divided into two pieces, wherein inner diameter sections in a joined condition are provided with a step 23*a* for receiving one end of the steel pipe 21. The other end of the steel pipe 21 is provided with a female taper 21*a*.

Referring to the other steel pipe 22, the base section (e.g. about half the overall length) is held within a clamping die 24 in such a manner that the outer circumstance is put under control. This clamping die is also divided into two pieces, wherein an inner diameter section in a joined condition is provided with a step 24*a* for receiving one end of the steel pipe 22. The other end of the steel pipe 22 is provided with a male taper 22*a*.

In the above construction, the clamping dies 23 and 24 are caused to come closer in a condition in which the axes of the dies coincide. Thus, the male taper 22*a* provided on the end of the steel pipe 22 contacts the female taper 21*a* provided on the end of the steel pipe 21. When the clamping dies 23 and 24 are caused to come still closer, as shown in FIG. 7 (*b*), the steel pipe 22 is press-fitted into the inside of the steel pipe 21 while reducing the diameter of the steel pipe 22.

Figure 8:
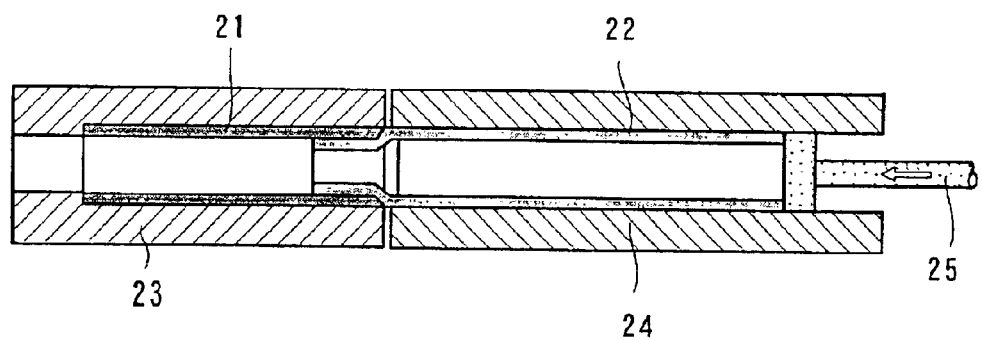
FIG. 8 is a view showing another embodiment of a device for forming the pipe member show in FIG. 6.
Figure 9:
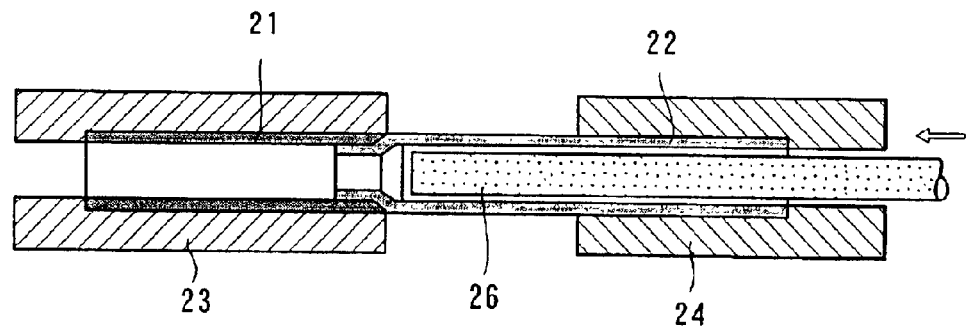
FIG. 9 is a view showing a still further embodiment of the device for forming the pipe member shown in FIG. 6.
Figure 10:
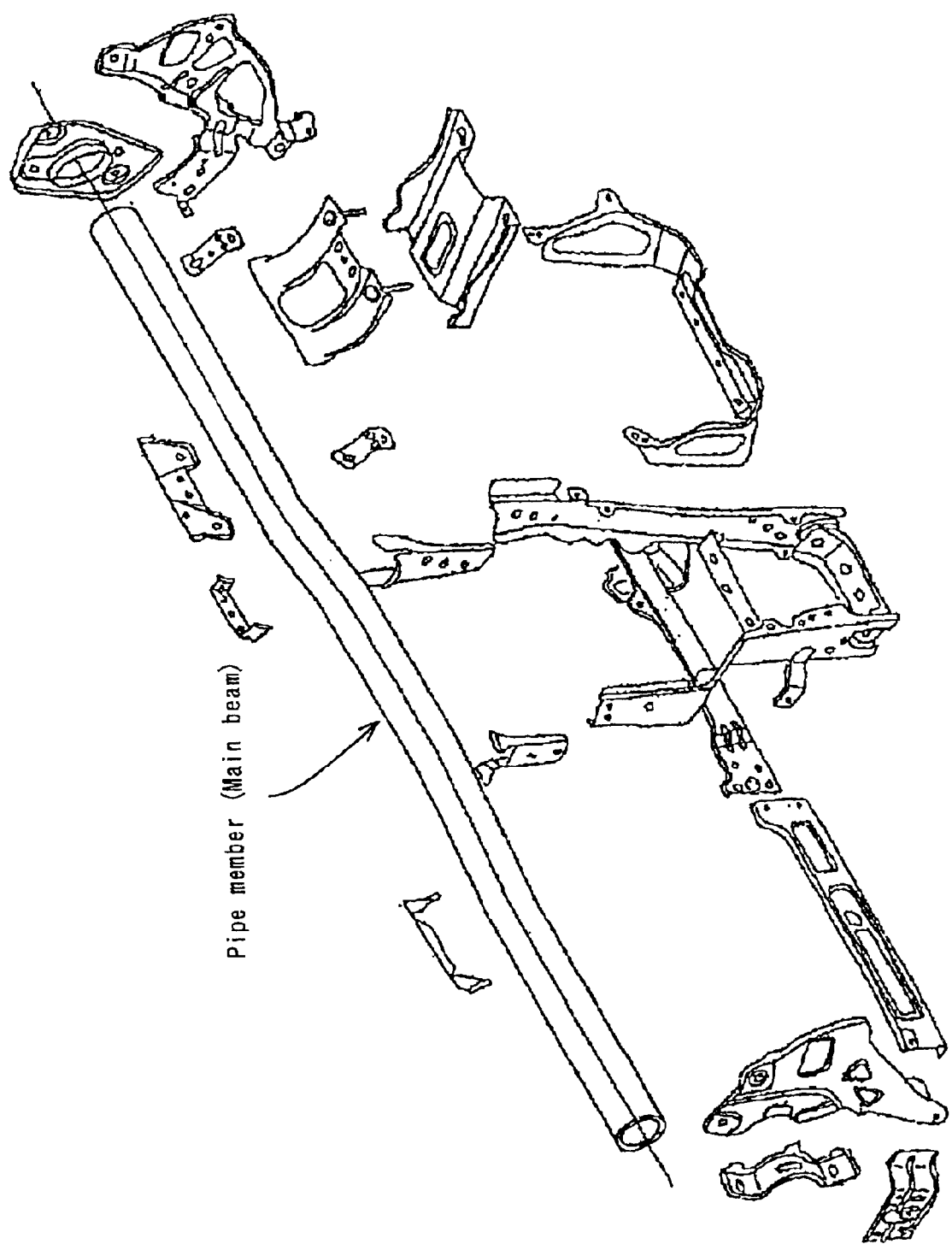
FIG. 10 is an exploded perspective view showing one example of a conventional steering hanger beam.
Figure 11:
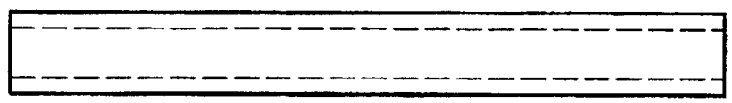
FIG. 11 is a view showing the structure of a conventional pipe member (an integral type)
Figure 12:
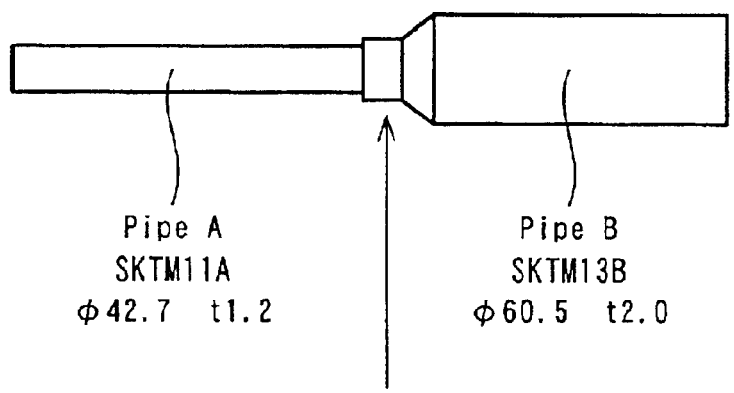
FIG. 12 is a view showing the structure of a conventional pipe member (a split type).

FIGS. 8 and 9 are views showing another embodiment of a device for forming the pipe member shown in FIG. 6. In the embodiment shown in FIG. 8, the steel pipe 22 is press-fitted into the steel pipe 21 using a press-fit mandrel 25. In the embodiment shown in FIG. 9, the steel pipe 22 is press-fitted into the steel pipe 21 using a guide mandrel 26. In each case, it is possible to effectively prevent the steel pipe 22 from being bent by the press-fit load.

It is desirable that a lubricant be applied to the inner surface of the steel pipe 21 or the outer surface of the steel pipe 22, or a bonderizing treatment be made thereon.

It is to be noted that two pipes are shown in the figures as an example of multiple pipes, but three pipes or more can also be used.

As described above, according to the present invention, a pipe member is partially designed to have a multiple pipe structure and the diameter of the multiple pipe structure section is integrally expanded. Accordingly, it is possible to provide a pipe member that can not only ensure the strength and rigidity necessary for each section, but also improve lightening of the pipe member. By applying the pipe member according to the present invention to a main beam such as a steering hanger beam for use in an automobile, it is possible to provide the strength and rigidity necessary for each section of the driver' seat side and passenger's seat side. It is also possible to lighten the steering hanger beam and the like.

What is claimed is:

1. A pipe member having metal pipes of different diameters, said pipe member prepared by a process comprising:

moving one of a metal pipe of a larger diameter and shorter length and a metal pipe of a smaller diameter and longer length, said metal pipe of a smaller diameter having an outside, said metal pipe of a larger diameter engaging the outside of the metal pipe of the smaller diameter to provide a multiple pipe structure in a predetermined area in a longitudinal direction; and expanding integrally at least a portion of only the multiple pipe structure to expand a diameter of the multiple pipe structure, wherein an end of the multiple pipe structure is provided with a tapered section of which the amount of diameter expansion gradually increases.

2. The pipe member according to claim 1, wherein one metal pipe forming the multiple pipes is of a different material than the other metal pipes.

3. The pipe member according to claim 1, wherein one metal pipe forming the multiple pipes is made of aluminum and the other metal pipes are made of steels.

* * * * *

UNITED STATES PATENT AND TRADEMARK OFFICE
CERTIFICATE OF CORRECTION

PATENT NO. : 6,817,382 B2
DATED : November 16, 2004
INVENTOR(S) : Tanaka et al.

It is certified that error appears in the above-identified patent and that said Letters Patent is hereby corrected as shown below:

Title page,
Item [54], Title, "PILE MEMBER" should read -- PIPE MEMBER --.
Item [73], Assignee, "Bestex Kyoel Co., Ltd.," should read
-- Bestex Kyoei Co., Ltd. --.

Signed and Sealed this

Twenty-seventh Day of September, 2005

JON W. DUDAS
*Director of the United States Patent and Trademark Office*